United States Patent [19]

Oshibe et al.

[11] Patent Number: 5,428,108
[45] Date of Patent: Jun. 27, 1995

[54] UNSATURATED GROUP AND FLUORINE CONTAINING BLOCK COPOLYMERS, PROCESS FOR PREPARING THE SAME AND USE

[75] Inventors: Yoshihiro Oshibe; Michihisa Yamada; Hisao Yamamoto; Hiroshi Ohmura, all of Aichi, Japan

[73] Assignee: Nippon Oil & Fats Co., Ltd., Tokyo, Japan

[21] Appl. No.: 192,133

[22] Filed: Feb. 3, 1994

Related U.S. Application Data

[62] Division of Ser. No. 701,456, May 15, 1991, abandoned.

[51] Int. Cl.⁶ .................................. C08F 259/08
[52] U.S. Cl. ................................. 525/200; 525/276
[58] Field of Search ........................ 525/200, 276

[56] References Cited

U.S. PATENT DOCUMENTS

| | | | |
|---|---|---|---|
| 3,799,992 | 3/1974 | Pittman et al. | 525/276 |
| 4,786,658 | 11/1988 | Hashimoto et al. | 525/276 |
| 4,833,207 | 5/1989 | Kinaga et al. | 525/276 |
| 4,877,839 | 10/1989 | Conti-Ramsden et al. | 525/200 |
| 4,916,191 | 4/1990 | Takeuchi et al. | 525/276 |
| 4,988,771 | 1/1991 | Takeuchi et al. | 525/276 |
| 5,057,577 | 10/1991 | Matsuo et al. | 525/276 |

FOREIGN PATENT DOCUMENTS

0161804  11/1985  European Pat. Off. ............. 525/276

OTHER PUBLICATIONS

Morrison & Boyd, "Organic Chemistry", pp. 156–159, (1973).

*Primary Examiner*—James J. Seidleck
*Assistant Examiner*—Patrick R. Delaney
*Attorney, Agent, or Firm*—Stetina Brunda & Buyan

[57] ABSTRACT

The present block copolymer contains a structural unit (A) derived from a compound represented by the general formula (I): $CH_2=CR_1COOR_2R_f$, and also contains a structural unit (B) consisting of a polymer moiety represented by at least one of the structural formulae (III) and (IV) and another polymer moiety derived from a compound represented by the general formula (II): $CH_2=CR_3R_4$. For preparing the above block copolymer, a block copolymer consisting of the structural unit (A) derived from a compound represented by the general formula (I): $CH_2=CR_1COOR_2R_f$ and the structural unit (B1) derived from a compound represented by the general formula (II): $CH_2=CR_3R_4$ and a compound represented by the general formula (V): $CH=CR_6COO(R_9)_tH$ are reacted with a compound represented by the general formula (VI): $R_{10}COCl$ to allow a dehydrochlorination reaction to take place. Thus, an unsaturated group and fluorine containing block copolymer having excellent water and oil repellent properties and excellent sensitivity to activation energy rays can be prepared. The block copolymer is utilized as a surface modifier for activation energy-curing resins.

4 Claims, No Drawings

UNSATURATED GROUP AND FLUORINE CONTAINING BLOCK COPOLYMERS, PROCESS FOR PREPARING THE SAME AND USE

This application is a division, of application Ser. No. 07/701,456, filed May 15, 1991, now abandoned.

BACKGROUND OF THE INVENTION

This application claims the priority of Japanese Patent Application No. 2-128258 filed May 17, 1990 which is incorporated herein by reference.

1. Field of the Invention

This invention relates to a block copolymer, a process for preparing the same and the use thereof. More particularly it relates to a block copolymer containing an unsaturated group sensitive to activation energy rays such as ultraviolet rays and electron beams and also fluorine atoms having water and oil repellent properties.

2. Description of the Related Art

It is known that a fluorine containing block copolymer is useful as a surface modifier for polymeric materials. It is disclosed, for example, in Japanese Unexamined Patent Publication (Kokai) No. 60-22410 that when a perfluoroalkyl containing block copolymer is added to a polymeric material, the block copolymer is oriented on the surface of the polymeric material to impart water and oil repellency and antifouling properties to the surface of the material. Japanese Unexamined Patent Publication (Kokai) No. 2-4877 also discloses coating the surface of synthetic resin sheets with a fluorine containing block copolymer. When such sheets are stacked, they do not stick together and thus facilitate peeling of each sheet. Further, Japanese Unexamined Patent Publication (Kokai) No. 2-4812 discloses that addition of a fluorine containing block copolymer to an electrical insulating material can impart moisture resistance to the material.

On the other hand, some fluorine containing polymers are known which can accelerate curing by irradiation of an activation energy ray. Such polymers are used as solder resist materials and coating materials. For example, Japanese Unexamined Patent Publication (Kokai) No. 58-215411 discloses that a radical copolymerization reaction between a monomer having photodimerization reactivity and a fluorine containing monomer affords a photosensitive fluorine containing polymer. It is also disclosed in Japanese Unexamined Patent Publication (Kokai) Nos. 62-25104 and 63-301268 that a fluorine containing polymer is produced through copolymerization between a hydroxyl containing vinyl ether and a fluoroolefin, followed by reaction of the resulting fluorine containing copolymer with a compound having an isocyanate group and an unsaturated group to afford a polymer curable by an activation energy ray. In addition, Japanese Unexamined Patent Publication (Kokai) No. 62-190264 discloses that reaction between three kinds of compounds, i.e. a fluorine containing block copolymer having a hydroxyl group, an isocyanate compound and a compound having a hydroxyl group and an unsaturated group forms a photosensitive polymer.

However, since the block copolymer containing an unsaturated group and fluorine atoms described in the above publications is produced by use of a compound having an isocyanate group and an unsaturated group, it suffers a problem that gelation is liable to occur during the reaction. It is possible to use the isocyanate compound in a large amount for preventing the gelation, but polymerization of the fluorine containing block copolymer proceeds to increase the molecular weight thereof, while the proportion of the fluorine containing polymer moiety is reduced. Thus, when the above block copolymer is used as a surface modifier, it tends to show reduced surface activating power, failing to impart sufficient water and oil repellent properties derived from fluorine atoms to the surface of the polymer. In addition, the polymer has low surface orientation in the fluorine containing polymer moiety and the network macromolecularization proceeds in the portion that is not irradiated with activation energy rays. Therefore, when the polymer is used as a resist material, it suffers a problem that it can not always exhibit the functions of the fluorine containing polymer and it lacks the desired reactivity with various developing agents.

SUMMARY OF THE INVENTION

This invention has been accomplished with a view to solving the above problems and it is an object of this invention to provide a block copolymer containing an unsaturated group and fluorine atoms, which has excellent water and oil repellency and sensitivity to activation energy rays and a process for preparing the same.

A second object of this invention is to provide an improved surface modifier for activation energy ray curing resin.

A third object of this invention is to provide a resist material having not only good reactivity, but also water and oil repellent properties, non-adhesiveness, etc. which are exhibited as the functions of the fluorine containing polymer moiety.

In order to achieve the above objects, the block copolymer according to this invention contains a structural unit (A) derived from a compound represented by the general formula (I):

$$CH_2=CR_1COOR_2R_f$$ 

The above block copolymer further contains another structural unit (B) consisting of a polymer moiety represented by at least one of the following structural formulas (III):

$$-(CHCR_8)- \atop | \atop OCO(R_9)_iCOR_{10}$$ (III)

and (IV):

$$-(CHCR_{11})- \atop | \atop OCOR_{12}$$ (IV)

and a polymer moiety derived from a compound represented by the general formula (II):

$$CH_2=CR_3R$$ (II)

In the above general formula (I), $R_1$ represents a hydrogen atom or a methyl group; $R_2$ represents a group $C_pH_{2p}-$, $C(C_pH_{2p+1})H-$, $-CH_2C(C_pH_{2p+1})H-$ or $-CH_2CH_2O-$; $R_f$ represents $C_nF_{2n+1}$, $(CF_2)_nH$, $(CF_2)_pOC_mH_{2m}C_iF_{2i+1}$, $(CF_2)_pOC_mH_{2m}C_iF_{2i}H$, $-NCOC_nF_{2n+1}$ or $-NCSO_2C_nF_{2n+1}$,
$\quad\ \ |$ $\qquad\qquad\quad\ \ |$
$C_pH_{2p+1}$ $\qquad\qquad\ C_pH_{2p+1}$ wherein p, n, i and m each are an integer of 1 to 10, 1 to 16, 1 to 16 and 0 to 10, respectively.

$R_3$ in the above general formula (II) represents a hydrogen atom, a methyl group or $-CH_2COOH$. $R_4$ includes $-COOR_5$, wherein $R_5$ represents a hydrogen atom, $-CH_2C_6H_5$,

[cyclohexyl-H], [dicyclopentadienyl], $-CH_2CH{-}CH_2$,
$\qquad\qquad\qquad\qquad\qquad\qquad\quad\ \backslash_O/$ $-CH_2CH_2N(C_sH_{2s+1})_2$, $-CH_2CH=CH_2$, $C_nH_{2n+1}$(straight or branched), $C_pH_{2p+1}OH$ (straight or branched), $-CH_2CH(OH)CH_3$, $(CH_2H_4O)_rC_sH_{2s+1}$ or $[CH_2CH(CH_3)O]_rC_sH_{2s+1}$, in which p, n, r and s each are an integer of 1 to 10, 1 to 16, 2 to 20 and 0 to 8, respectively.

Further, $R_4$ includes $-CONR_6R_7$, wherein $R_6$ represents a hydrogen atom or $C_pH_{2p+1}$; and $R_7$ represents a hydrogen atom, $-CH_2OH$ or $C_pH_{2p+1}$ (straight or branched), in which p is an integer of 1 to 10.

Still further $R_4$ includes $-CON\diagup^{\diagdown}O$,
$\quad\ \ \diagdown\underline{\quad}\diagup$ $-CONHC(CH_3)_2CH_2COCH_3$, $-CONHC(CH_3)_2CH_2SO_3H$, $-C_5H_6$, $-CN$ or $-OCOC_nH_{2n+1}$ (straight or branched), wherein n is an integer of 1 to 16.

$R_8$ in the above structural formula (III) represents a hydrogen atom or a methyl group; $R_9$ represents $C_2H_4O-$ or $CH_2CH(CH_3)O-$; and $R_{10}$ (unsaturated Group) represents $C_6H_5CH=CH-$, [furyl]$CH=CH-$, $CH_2=CH-$, $CH_2=C(CH_3)-$, $CH_2=CHCOOC_2H_4O-$, $CH_2=C(CH_3)COOC_2H_4O-$, $\qquad\qquad\qquad\qquad\qquad\qquad CH_3$
$\qquad\qquad\qquad\qquad\qquad\qquad |$
$\quad\ \ CH_2OCOCH=CH_2\qquad\ CH_2OCOC=CH_2$
$\quad\ \ |\qquad\qquad\qquad\qquad\ \ |$
$-OCH_2-C-OCOCH=CH_2,\ -O-C-H$,
$\quad\ \ |\qquad\qquad\qquad\qquad\ \ |$
$\quad\ \ CH_2OCOCH=CH_2\qquad\ CH_2OCOC=CH_2$
$\qquad\qquad\qquad\qquad\qquad\qquad |$
$\qquad\qquad\qquad\qquad\qquad\qquad CH_3$ $\qquad\qquad\qquad\qquad\qquad\qquad\ \ CH_3$
$\qquad\qquad\qquad\qquad\qquad\qquad\ \ \diagup$
$\ CH_2OCOCH=CH_2\qquad\quad CH_2OCOC=CH_2$
$\ |\qquad\qquad\qquad\qquad\qquad\quad |$
$-CH\qquad\qquad\quad\ \ or\ \ -O-C-H$
$\ |\qquad\qquad\qquad\qquad\qquad\quad |$
$\ CH_2OCOCH=CH_2\qquad\quad CH_2OCOCH=CH_2$ wherein t is an integer of 1 to 20.

$R_{11}$ in the above structural formula (IV) represents a hydrogen atom or a methyl group; and $R_{12}$ represents $\qquad\qquad\qquad\qquad\qquad\quad\ CH_3$
$\qquad\qquad\qquad\qquad\qquad\quad\ \diagup$
$\ CH_2OCOCH=CH_2\qquad CH_2OCOC=CH_2$
$\ |\qquad\qquad\qquad\qquad\qquad |$
$-CH_2-C-OCOCH=CH_2,\ -CH$,
$\ |\qquad\qquad\qquad\qquad\qquad |$
$\ CH_2OCOCH=CH_2\qquad CH_2OCOC=CH_2$
$\qquad\qquad\qquad\qquad\qquad\quad\ \diagdown$
$\qquad\qquad\qquad\qquad\qquad\quad\ CH_3$ $\quad\ \ CH_3$
$\quad\ \ \diagup$
$\ CH_2OCOC=CH_2\qquad\qquad\qquad\qquad CH_3$
$\ |\qquad\qquad\qquad\qquad\qquad\qquad\qquad\ \diagup$
$-C-H\qquad\qquad\ \ ,\ -CH_2CH_2OCOC=CH_2$
$\ |$
$\ CH_2OCOC=CH_2$
$\qquad\qquad\ \ \diagdown$
$\qquad\qquad\ \ CH_3$ or $-CH_2CH_2OCOCH=CH_2$.

For preparing the above block copolymer, a block copolymer consisting of the structural unit (A) derived from a compound represented by the general formula (I):

$CH_2=CR_1COOR_2R_f$;

a structural unit (B1) derived from a compound represented by the general formula (II):

$CH_2=CR_3R_4$ and a compound represented by the general formula (V):

$CH=CR_8COO(R_9)_tH$ is reacted with a compound represented by the general formula (VI):

$R_{10}COCl$ to allow a dehydrochlorination reaction to take place.

$R_8$ in the above general formula (V) represents a hydrogen atom or a methyl group; $R_9$ represents $C_2H_4O-$ or $CH_2CH(CH_3)O-$; and t is an integer of 1 to 20.

$R_{10}$ in the above general formula (VI) represents $C_8H_5CH=CH-$, $-CH=CH\diagup^{\diagdown}\diagdown$, $CH_2=CH-$,
$\qquad\qquad\diagdown_O\diagup$ $CH_2=C(CH_3)-$, $CH_2=CHCOOC_2H_4O-$ or $CH_2=C(CH_3COOC_2H_4O-$.

The following process can be used for preparing the above block copolymer. To describe in detail, a block copolymer consisting of a structural unit (A) derived from a compound represented by the general formula (I):

$CH_2=CR_1COOR_2R_f$;

a structural unit (B2) derived from a compound represented by the general formula (II):

and a compound represented by the general formula (VII):

$R_{13}COCl$ is reacted with a compound represented by the general formula (VIII):

$R_{12}OH$ to allow a dehydrochlorination reaction to take place.

Here, $R_{13}$ in the above general formula (VII) represents $CH_2=CH-$, $CH_2=C(CH_3)-CH_{CHCOOC2-H_4O}-$ or $CH_2=C(CH_3)COOC_2H_4O-$.

$R_{12}$ in the above general formula (VIII) represents

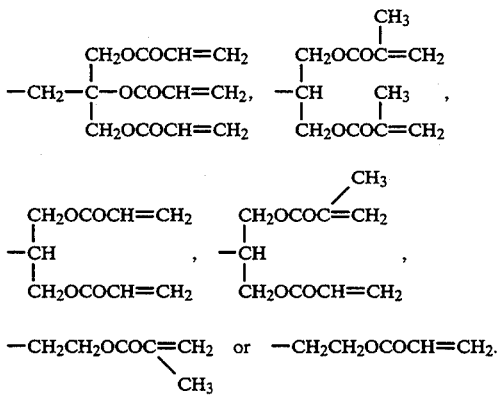

Further, the surfaces of the above polymeric materials can be modified and maintained as such for an extended period of time by addition of the block copolymer to an activation energy ray-curing polymeric material and then by curing it by irradiation of activation energy rays. The block copolymer can be used as a resist material which can exhibit the functions of the non fluorine containing polymer moiety by applying the block copolymer on various materials and forming exposed portions and unexposed portions.

DETAILED DESCRIPTION OF THE INVENTION

The structural unit (A) of the present block copolymer will be described below. In order for the block copolymer to exhibit surface activity, it is essential that the structural unit (A) be a polymer derived from a compound represented by the general formula (I):

$CH_2=CR_1COOR_2R_f$ wherein $R_1$ represents a hydrogen atom or a methyl group; $R_2$ represents $C_pH_{2p}-$, $C(C_pH_{2p+1})H-$ or $-CH_2CH_2O-$; $R_f$ represents $C_nF_{2n+1}-$, $(CF_2)_nH$, $(CF_2)_pOC_mH_{2m}C_iF_{2i+1}$, $(CF_2)_pOC_mH_{2m}C_iF_{2i}H$,

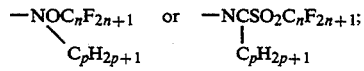

and p, n, i and m each are an integer of 1 to 10, 1 to 16, 1 to 16 and 0 to 10, respectively. If p and m are greater than 10, the properties derived from the perfluoroalkyl group are reduced, unfavorably. In addition, if n and i exceed 16, synthesis of the monomer will be difficult and further the properties derived from the perfluoroalkyl group cannot sufficiently be exhibited, unfavorably. Preferably, p, m, n and i each are 1 to 4, 0 to 4, 1 to 10 and 1 to 10, respectively, and it is more preferred that the perfluoroalkyl group is terminated by $-CF_3$.

As the monomers to be represented by the above general formula (I), one or two compounds selected from the following can be used:

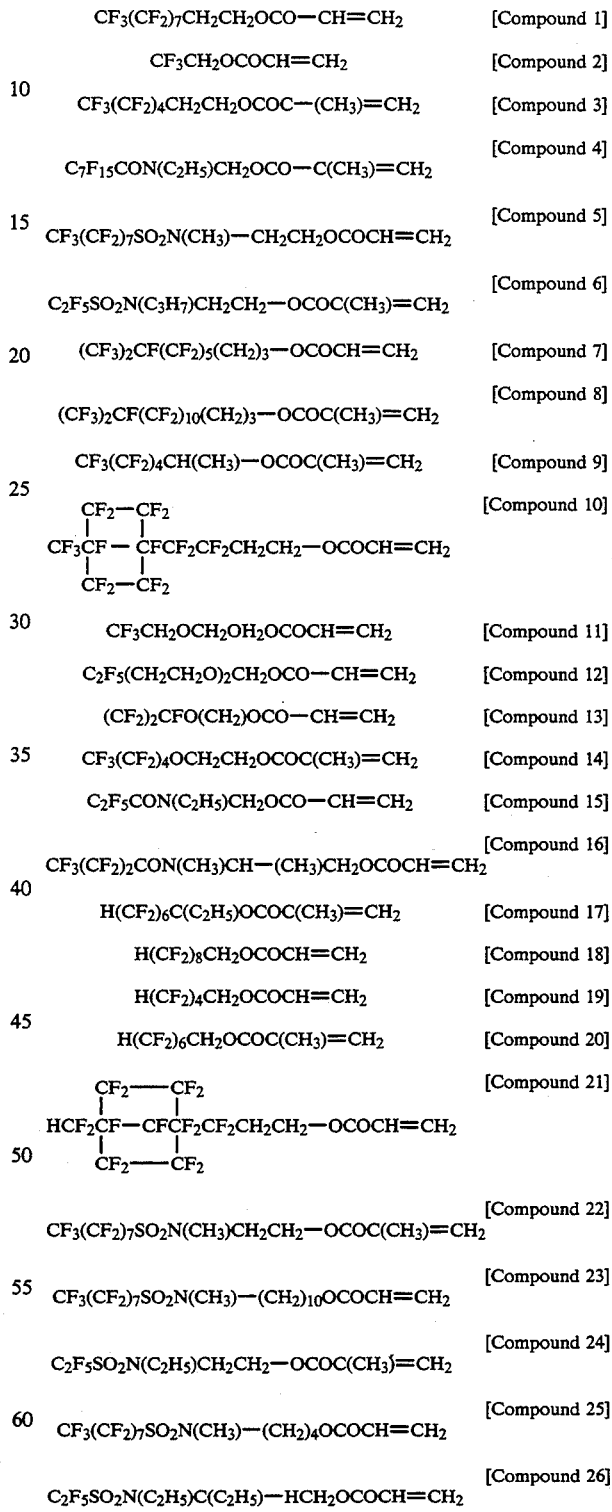

On the other hand, the above structural unit (A) preferably consists of not less than 40% by weight of a polymer moiety (A1) derived from a compound of the above general formula (I) and not more than 60% by weight of a polymer moiety (A2) derived from a compound of the above general formula (II). If the polymeric moiety (A1) is less than 40% by weight, the resulting block copolymer comes to have insufficient surface activating power, so that the functions of the copolymer when used as a surface modifier or a resist material will be lowered.

The monomer compounds represented by the above general formula (II) may typically include those given below, and at least one monomer suitably selected from them can be used:

Acrylic acid esters and/or methacrylic acid esters [hereinafter referred to as (meth)acrylates] such as methyl (meth)acrylate, ethyl (meth)acrylate, n-propyl (meth)acrylate, isopropyl (meth)acrylate, glysidyl (meth)acrylate, n-butyl (meth)acrylate, isobutyl (meth)acrylate, tert-butyl (meth)acrylate, 2-ethylhexyl (meth)acrylate, octyl (meth)acrylate, lauryl (meth)acrylate, stearyl (meth)acrylate, cyclohexyl (meth)acrylate, benzyl (meth)acrylate, and N,N-dimethylaminoethyl (meth)acrylate; hydroxy (meth)acrylates such as hydroxyethyl (meth)acrylate, hydroxypropyl (meth)acrylate and 3-chloro-2-hydroxypropyl (meth)acrylate; (meth)acrylic acid esters of polyethylene glycol or polypropylene glycol such as triethylene glycol (meth)acrylate and dipropylene glycol (meth)acrylate; aromatic vinyl monomers such as styrene, vinyl toluene and a-methylstyrene; vinyl esters of carboxylic acid such as vinyl formate, vinyl acetate, vinyl propionate and vinyl stearate; amido group containing vinyl monomers such as (meth)acrylamide, N-methyl(meth)acrylamide, N,N-dimethyl(meth)acrylamide, N-(meth)acryloylmorpholine and 2-acrylamido-2-methylpropanesulfonic acid; (meth)acrylic acid; itaconic acid, etc.

Next, the structural unit (B) of the present block copolymer will be described below. It is essential that the structural unit (B) contains a component represented by the structural formula (III) or (IV) so that the block copolymer can exhibit sensitivity to activation energy rays (hereinafter simply referred to as "sensitivity"). The proportion of such component in the structural unit (B) is suitably decided, preferably in the range of 1 to 98% by weight, depending on the use of the block copolymer and the types of unsaturated groups. If the content of the component is less than 1% by weight irrespective of the kind of unsaturated group, sensitivity of the block copolymer tends to be insufficient.

When

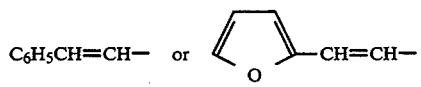

is selected as $R_{10}$ (unsaturated group) in the structural formula (III), the appropriate sensitivity may sometimes be exhibited if the component represented by the structural formula (III) is contained in a higher proportion. In this case, however, if such component is contained in an amount exceeding 98% by weight, adhesion to substrates to be coated and developing feasibility as a resist material tend to be reduced. Further, the above unsaturated groups should suitably be present in an amount of not less than 20% by weight in order that the block copolymer can exhibit sufficient sensitivity.

If the unsaturated group $(R_{10})$ is $CH_2=CH-$, $CH_2=C(CH_3)-$, $CH_2=CHCOOC_2H_4O-$ or $CH_2=C(CH_3)COOC_2H_4O-$, the proportion of the compound of the structural formula (III) is more suitably 3 to 70% by weight. If t in the structural formula (III) is greater than 20, water and oil repellency of the block copolymer tends to be inhibited whereby to reduce adhesion to the substrate to be coated.

In the case where the unsaturated group $(R_{12})$ in the structure formula (IV) is

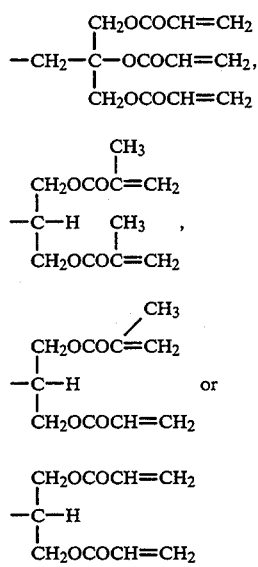

the proportion of the compound of the structural formula (IV) is more suitably 3 to 70% by weight.

The above structural unit (B) essentially containing the compound of the General formula (II) can impart Good adhesion to the substrate, excellent film forming properties and developing properties to the block copolymer. Moreover, when the compound of the general formula (II) is added as a surface modifier to an activation energy ray-curing resin, it contributes to improve good compatibility with the resin.

The rate of the structural unit (A) to the structural unit (B) is desirably 80/20 to 10/90 in terms of the weight ratio. If the ratio of the structural unit (A) is more than 80% by weight, sensitivity to activation energy rays or adhesion to substrates may be lowered unfavorably. In addition, when the block copolymer is used as a surface modifier for an activation energy ray-curable resin, it sometimes suffers a problem in the compatibility with the resin. On the other hand, if the proportion of the structural unit (A) is less than 10% by weight, the surface activating power derived from the structural unit (A) cannot be exhibited sufficiently, ad when particularly such block copolymer is used as a surface modifier, its surface orientation property will be insufficient.

It is difficult to determine real molecular weight of the present block copolymer containing an unsaturated group and fluorine atoms because it is difficult to select a good solvent for both the structural unit (A) and the structural unit (B). However, the appropriate range of molecular weight can be defined based on the viscosity of the polymer solution. To describe specifically, a polymer having an appropriate molecular weight suitably has a viscosity at 25° C. of 0.05 to 10 poise, when dissolved or dispersed in a good solvent of the structural unit (B) typified by dimethylformamide (hereinafter abbreviated as DHF), methyl ethyl ketone (hereinafter abbreviated as HEK), etc. and adjusted to a concentration of 30% by weight. If the viscosity is less than 0.05 poise, the film forming properties and developability will be reduced unfavorably when the block copolymer is used as a resist material, whereas if it is more than 10 poise, the surface orientation properties will be lowered when it is used as a surface modifier for an activation energy ray-curing resin.

In the following, a process for preparing the block copolymer of this invention will be described.

First, a fluorine containing block copolymer having a structural unit (B1) or (B2) and a structural unit (A) is synthesized by any known procedure; wherein the structural unit (B1) is derived from, a compound represented by the above general formula (II):

$$CH_2=CR_3R_4$$

and a compound represented by the general formula (V):

$$CH=CR_8COO(R_9)_tH$$

wherein $R_8$ represents a hydrogen atom or a methyl group; $R_9$ represents $C_2H_4O-$ or $CH_2CH(CH_3)O-$; and t is an integer of 1 to 20.

The structural unit (B2) is derived from a compound represented by the general formula (II):

$$CH_2=CR_3R_4$$

and a compound represented by the general formula (VII):

$$R_{13}COCl$$

wherein, $R_{13}$ represents $CH_2=CH-$, $CH_2=C(CH_3)-$, $CH_2=CHCOOC_2H_4O-$ or $CH_2=C(CH_3)COOC_2H_4O-$.

Synthesis of the fluorine containing block copolymer is preferably carried out through radical polymerization using a polymeric oxide having at least two peroxy bonds in one molecule or a polyazo compound having at least two azo bonds in one molecule as a polymerization initiator, taking ease of industrial productivity and various performances into consideration. When the structural unit (B1) is used, a polymerization method such as bulk polymerization, suspension polymerization, solution polymerization and emulsion polymerization can be employed. When the structural unit (B2) is used, bulk polymerization or solution polymerization can be employed.

The preparation process in the case where a polymeric peroxide is used as a polymerization initiator will now be described specifically. A copolymerization reaction between the monomer represented by the general formula (II) and the monomer represented by the general formula (V) or (VII) is carried out with the aid of a polymeric peroxide so as to form the structural unit (B1) or (B2), whereby a peroxy bond containing vinyl copolymer having a peroxy bond introduced in the molecular chain can be obtained. To the resulting copolymer is added the monomer of the general formula (I) alone or in admixture with the monomer of the general formula (II) for forming the structural unit (A). Then, polymerization is effected to afford efficiently a block copolymer through cleavage of the peroxy bond.

Subsequently, dehydrochlorination reaction between the block copolymer containing the structural unit (B1) or (B2) and the compound represented by the general formula (VI):

$$R_{10}COCl$$

or the compound represented by the General formula (VIII):

$$R_{12}OH$$

is carried out to afford a fluorine containing block copolymer to which an unsaturated group is introduced. As the reaction conditions, the ratio of the OH group contained in the structural unit (B1) to the compound of the general formula (VI) is suitably 1/0.3 to 1/1.3 in terms of the molar weight. If the ratio of the compound (VI) is less than 0.3, the fluorine containing block copolymer comes to contain too many OH groups whereby the properties to be brought about by the structural unit (A) such as water or oil repellency will be impaired. Although better reactivity can be obtained if the content of the compound (VI) is greater, intricate procedures are required for removing the excess compound (VI) after completion of the reaction. For such reasons, the ratio of the compound (IV) should appropriately be not exceeding 1.3.

On the other hand, when the structural unit (B2) is used, the ratio of the —COCl groups and the compound of the general formula (VIII) contained in the structural unit (B2) is suitably 1/1 to 1/1.3 in terms of the molar weight. If the content of the compound (VIII) is less than 1, the —COCl Groups remain unreacted. Although better reactivity can be obtained if the content of the compound (VIII) is greater, water and oil repellency may sometimes be impaired by the excess amount of the compound (VIII) after completion of the reaction, unfavorably.

In order to achieve sufficient reactivity and prevent the block copolymer from macromolecularization through thermal polymerization of the unsaturated groups, the reaction is suitably carried out at 10° to 60° C. The method of dehydrochlorination includes those known per se wherein pyridine is allowed to be present in the reaction system to precipitate hydrochloride, or nitrogen gas is bubbled through the system to exhaust hydrochloride gas thus generated. It is essential to control the reaction, since the dehydrochlorination reaction occurs very rapidly and it is of exothermic.

Incidentally, as the compounds of the General formulae (VI) and (VII), commercially available products or those synthesized according to known processes can be employed. The composition of the block copolymer thus synthesized can be analyzed by known means such as NMR (nuclear magnetic resonance), IR (Infrared absorption analysis), elemental analysis, etc.

DESCRIPTION OF THE PREFERRED EMBODIMENTS

EXAMPLES

This invention will be described below specifically by way of Examples in contrast to Comparative examples, wherein part(s) and % mean part(s) by weight and % by weight, respectively.

Example 1

(1) Synthesis of peroxy bond containing polymer

In a reactor equipped with a thermometer, a stirrer and a reflux condenser were charged 75 parts of MEK and 75 parts of DMF, and the mixture was heated to 70° C. under blowing of nitrogen gas thereinto. Further, a mixture of 100 parts of MEK, 35 parts of DMF, 120 parts of methyl methacrylate (hereinafter abbreviated as MMA), 80 parts of hydroxyethyl methacrylate (hereinafter abbreviated as HEMA) and 15 parts of Compound 28 of the formula:

$$-[CO(CH_2)_4COO(C_2H_4O)_3CO(CH_2)_4COOO]_{10}-$$

was charged in the above reactor over 2 hours to further effect polymerization reaction for 4 hours to obtain a solution of peroxy bond containing polymer.

The polymer conversions of MMA and HEMA determined by measuring the amount of the residual monomers through gas chromatography (hereinafter referred to as GC) were 97% or more, respectively. The polymer solution was diluted to 4-fold amount with DMF, and the diluted solution was charged into a great excess of hexane with stirring to reprecipitate the polymer. The polymer precipitated was dried well to give a polymer as a powder. As the result of GC analysis, it was confirmed that there was no residual monomer. The powdery polymer had an active oxygen amount of 0.13% and the number average molecular weight in terms of polystyrene determined by gel permeation chromatography (hereinafter referred to as GPC) was 15000.

(2) Synthesis of block copolymer

In a reactor equipped with a thermometer, a stirrer and a reflux condenser were charged 28 parts of the powdery acrylic polymer as obtained in the above process (1), 12 parts of Compound 1 of the formula:

$$CF_3(CF_2)_7CH_2CH_2CH_2OCO-CH=CH_2$$

and 60 parts of DMF, and the mixture was reacted at 70° C. for 10 hours under blowing of nitrogen gas thereinto. The polymer conversion of the fluoro-monomer was 98%.

The polymer solution thus obtained was diluted to 4-fold amount with DMF, and the diluted solution was charged into a great excess of $H_2O$ with stirring to reprecipitate the polymer. The polymer precipitated was dried well to give a polymer as powder.

In a mixed solvent of 450 parts of methanol and 150 parts of butyl acetate was charged 30 parts of the thus obtained micro powder, and the mixture was stirred at 50° C. for 8 hours to extract the fluorine free acrylic polymer which is one of the two by-products. Subsequently, the remaining polymer was charged in 600 parts of trichlorotrifluoroethane and the mixture was stirred at 40° C. for 48 hours to extract the fluorine containing polymer.

As the result, it was found that the constitutional ratio of the block copolymer/fluorine free acrylic polymer/fluorine containing polymer was 7.0/2.4/0.6. From the above result, the weight ratio of the fluorine containing polymer moiety [structural unit (A)] and the fluorine free polymer moiety [structural unit (B1)] can be determined as follows:

To describe in detail, the content of the block copolymer is 28 parts (70% of the total amount of 28 parts of the acrylic polymer and 12 parts of the fluoro-monomer of Compound 1 of the formula:

$$CF_3(CF_2)_7CH_2CH_2OCO-CH=CH_2),$$

and the content of homopolymers is 12 parts, wherein the fluoro-polymer is 2.4 parts (20% of 12 parts) and the acrylic polymer is 9.6 parts (80% of 12 parts). Accordingly, the fluorine segment of the block copolymer is 9.6 parts (12 parts-2.4 parts=9.6 parts), and the acrylic segment thereof is 18.4 parts (28 parts-9.6 parts=18.4 parts). Therefore, it was found that the weight ratio of the fluorine containing polymer moiety [structural unit (A)] to the fluorine free polymer moiety [structural unit (B1)] in the block copolymer is 34/66 (9.6/18.4).

As the result of NMR analysis of the block copolymer by use of deuterium substituted DMF, it was found that the constitutional ratio of the fluorine free polymer moieties was the same as that of the initial charges, i.e. MMA/HEMA=60/40.

(3) Reaction of introducing the unsaturated group into the block copolymer

In a reactor equipped with a thermometer, a stirrer and a reflux condenser were charged 5 parts of the block copolymer obtained in the above process (2), 15 parts of MEK and 1.58 parts (corresponding to 2-fold the molar quantity of the OH groups contained in the block copolymer) of pyridine to prepare a polymer solution. Subsequently, to the polymer solution was added dropwise a mixed solvent of 0.455 part (corresponding to 0.5-fold the molar quantity of the OH groups contained in the block copolymer) of acrylic chloride and 1.545 parts of MEK at 5° C. over 30 minutes, followed by further reaction at 50° C. for 2 hours.

After completion of the reaction, the pyridine hydrochloride was removed by filtration and the resulting polymer solution was diluted 3-fold with MEK. The diluted solution was poured into a great excess of $H_2O$/methanol (1:1 mixed solvent) with stirring to effect reprecipitation and purification of the polymer. When the thus obtained powdery polymer was dried well and then subjected to GPC analysis using DMF as an eluent, it was found that the low molecular compounds such as pyridine and acrylic chloride were removed substantially completely.

To the thus treated polymer was added DMF to form a 20% solution. After a film was formed on a KBr transparent plate using the solution and dried sufficiently, IR determination was carried out. Characteristic absorption derived from the $CH_2=CH-$ group was observed in the vicinity of 1640 cm$^{-1}$ and it was confirmed that the unsaturated group was introduced into the polymer.

Further, as the result of NMR analysis by use of deuterium substituted DMF, it was found that a new proton peak derived from the $CH_2=CH-$ group appeared in the vicinity of 6.4 ppm, whereas the proton peak (3.8 and 4.2 ppm) derived from the group $-CH_2CH_2OH$ of the HEMA component was reduced. It became apparent from the peak area ratio including the peak (3.6 ppm) of the methyl ester proton of the MMA component that 50% of the groups $-CH_2CH_2OH$ of the HEMA component before reaction was substituted with the groups $-CH_2CH_2OCOCH=CH_2$.

Consequently, it was shown that the proportion of the polymer moiety consisting of the unit of the structural formula (III) in the structural unit (B) is 26% and that the weight ratio of the structural unit (A)/structural unit (B) of the polymer obtained in this reaction was 32/68.

On the other hand, DMF was added to the polymer powder to prepare a 30% solution, which had an appearance of bluish white dispersion and a viscosity of 0.8 poise at 25° C.

Example 2

(1) Synthesis of peroxy bond containing polymer

In a reactor equipped with a thermometer, a stirrer and a condenser was charged 150 parts of MEK, followed by heating to 70° C. under blowing of nitrogen gas thereinto. A mixture of 135 parts of MEK, 120 parts of MMA, 80 parts of Compound 27 of the formula

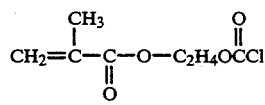

(hereinafter referred to as HEMA-CF) and 150 parts of Compound 28 of the formula —[CO(CH$_2$)$_4$COO(C$_2$H$_4$O)$_3$CO(CH$_2$)$_4$— COOO]$_{10}$— was further charged to the reactor over 2 hours and a polymerization reaction was carried out for further 4 hours to give a peroxy bond containing polymer solution.

Polymer conversions of MMA and HEMA-CF were both 97% or more from the result of determination of the amounts of the respective residual monomers. The polymer solution was diluted 4-fold with MEK, and the diluted solution was poured into a great excess of hexane with stirring to reprecipitate the polymer. The polymer precipitated was dried well to give a polymer as a powder. As the result of GC analysis of the polymer, it was confirmed that there was no residual monomer. The active oxygen content in the polymer powder was 0.13% and the number average molecular weight thereof determined by GPC was 15000 in terms of polystyrene.

(2) Synthesis of block copolymer

In a reactor equipped with a thermometer, a stirrer and a reflux condenser was charged a mixture of 28 parts of the polymer powder as obtained in the above process (1), 12 parts of Compound 1 of the formula CF$_3$(CF$_2$)$_7$CH$_2$CH$_2$OCO— CH═CH$_2$ and 60 parts of MEK and a polymerization reaction was carried out at 70° C. for 10 hours under blowing of nitrogen gas thereinto. Polymer conversion of the fluorine containing monomer was 98%.

The resulting polymer solution was diluted 4-fold with MEK, and the diluted solution was poured into a great excess of hexane with stirring to reprecipitate the polymer. The precipitated polymer was dried well to give a polymer as a powder.

To a solvent of 600 parts of butyl acetate was added 30 parts of the above powder and the mixture was stirred at 50° C. for 8 hours. The acrylic polymer containing no fluorine which is one of the two components by-produced was extracted. Subsequently, the residue of the polymer was charged in 600 parts of trichrolo-trifluoroethane and the mixture was stirred at 40° C. for 48 hours to extract the fluorine containing block copolymer.

Consequently, it was found that the constitutional ratio of the block copolymer/fluorine free acrylic polymer/fluorine containing polymer in the above powder was 7.0/2.4/0.6. Therefore, according to the same calculation as in Example 1, it was found that the weight ratio of the fluorine containing polymer moiety [structural unit (A)] to the fluorine free polymer moiety [structural unit (B1)] was 34/66.

As a result of NMR analysis by use of deuterium substituted DMF, it was found that the ratio of the constituents of the fluorine free polymer moiety was the same as that when charged, i.e. MMA/HEMA-CF=60/40.

Subsequently, in 99% ethyl alcohol neutralized with 0.1N (N/10) sodium hydroxide solution was dispersed 0.06 g of the block copolymer micro powder. The dispersion was subjected to neutralization titration, followed by further titration with N/10 silver nitrate solution, and it was found that the chlorine content in the block copolymer was about 4.8% and that the chloride atoms as per the theoretical value were introduced therein.

(3) Reaction of introducing unsaturated groups to block copolymer

In a reactor equipped with a thermometer, a stirrer and a reflux condenser were charged 5 parts of the block copolymer obtained in the above process (2) and 15 parts of MEK to form a polymer solution. Subsequently, to the solution was dropwise added at 50° C. a mixture of 1.16 parts of HEMA (1.3-fold the amount of chloride contained in the block copolymer), 1.1 parts of pyridine (2-fold the amount of chloride contained in the block copolymer) and 4.64 parts of MEK over 30 minutes, followed by further reaction at 50° C. for 2 hours.

After completion of the reaction, pyridine hydrochloride was removed by filtration and the resulting polymer solution was diluted 3-fold with DMF. The diluted solution was poured into a great excess of H$_2$O/methanol (1:1 mixture) with stirring to effect reprecipitation and purification of the polymer. When the polymer powder was dried well and subjected to GPC analysis using DMF as an eluent, it was found that the low molecular compounds such as pyridine and HEMA were substantially completely removed.

To the resulting polymer was added MEK to form a 20% solution. After a film was formed on a KBr transparent plate and dried well, IR determination was carried out. Characteristic absorption derived from the CH$_2$═CH(CH$_3$)— group was observed in the vicinity of 1640 cm$^{-1}$ and it was confirmed that the unsaturated group was introduced into the polymer.

Further, as a result of NMR analysis by use of deuterium substituted DMF, it was found that 100% of the groups of the formula CH$_2$═C(CH$_3$)COO—C$_2$H$_4$O— were introduced into the polymer.

Consequently, it was shown that the proportion of the polymer moiety consisting of the unit of the structural formula (III) in the structural unit (B) is 50% by weight and that the weight ratio of the structural unit (A)/structural unit (B) of the polymer obtained in this reaction was 30/70.

The 30 wt % MEK solution of the polymer powder had an appearance of bluish white dispersion and a viscosity of 0.8 poise at 25° C.

Examples 3 to 6

Using the same reactor as used in the above process (3) of Example 1, reactions were carried out between the block copolymer obtained in the process (2) of Example 1 and the chlorine compounds as shown in Table 1 to introduce the unsaturated groups in the block copolymers in Examples 3 to 6, respectively.

The reaction was carried out following the procedures in the process (3) of Example 1. To describe in detail, after the solution to be dropped shown in Table 1 was added dropwise to the polymer solution shown in Table 1 under the same conditions as in Example 1, the reaction was further allowed to continue.

The method for analyzing the polymer after completion of the reaction was the same as in the process (3) of Example 1. Purification conditions, analysis data of the polymer and the viscosity of the polymer solution in DMF are also shown in Tables 1 and 2.

TABLE 1

| Example | 3 | 4 | 5 | 6 |
|---|---|---|---|---|
| Polymer solution (part) | | | | |
| Block copolymer | 4 | 4 | 4 | 4 |
| MEK | 12 | 12 | 12 | 12 |
| Pyridine | 1.28 | 1.28 | 1.28 | 1.28 |
| Dropping Solution (part) | | | | |
| MEK | 1.66 | 2.06 | 2.23 | 2.38 |
| Chlorine compound (1) | 0.34 | 0.94 | — | — |
| Chlorine compound (2) | — | — | 0.77 | — |
| Chlorine compound (3) | — | — | — | 1.62 |
| Molar ratio of OH groups in block copolymer/chlorine compound/pyridine | 1/0.4/2 | 1/1.1/2 | 1/0.5/2 | 1/1.2/2 |

The chlorine compounds in Table 1 are as follows:

(1) Compound 29 of the formula $CH_2=C(CH_3)COCl$, (2) Compound 27 of the formula

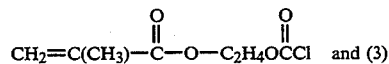

and (3) Compound 30 of the formula

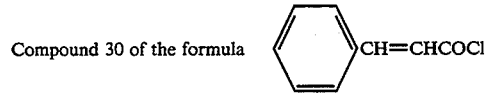

TABLE 2

| Example | 3 | 4 | 5 | 6 |
|---|---|---|---|---|
| Solvent for reprecipitation and purification | Mixed solvent | MeOH | Mixed solvent | MeOH |
| Analysis data of block copolymer | | | | |
| Presence of low molecular compound (GPC analysis) | No | No | No | No |
| Presence of unsaturated group (IR analysis) | Yes | Yes | Yes | Yes |
| Percentage of Compound 31 in the structural unit (B) (%) | 23 | 50 | 35 | 57 |
| Ratio of structural unit (A)/structural unit (B) | 32/68 | 30/70 | 29/71 | 27/73 |
| Viscosity of 30% polymer solution (poise/25° C.) | 0.9 | 0.7 | 1.1 | 0.6 |

The mixed solvent in Table 2 is methanol (MeOH)/$H_2O=1/1$

Examples 7 to 10

Using the same reactor as used in the process (3) of Example 2, reactions were carried out between the block copolymer obtained

TABLE 3

| Example | 7 | 8 | 9 | 10 |
|---|---|---|---|---|
| Polymer solution (part) | | | | |
| Block copolymer | 4 | 4 | 4 | 4 |
| MEK | 12 | 12 | 12 | 12 |
| Dropping Solution (part) | | | | |
| Pyridine | 0.87 | 0.87 | 0.87 | 0.87 |
| MEK | 2.31 | 1.92 | 4.95 | 3.78 |
| OH group containing compound (1) | 0.77 | 0.64 | — | — |
| OH group containing compound (2) | — | — | 1.65 | — |
| OH group containing compound (3) | — | — | — | 1.26 |
| Molar ratio of Cl group in block copolymer/OH group containing compound/pyridine | 1/1.2/2 | 1/1/2 | 1/1/2 | 1/1/2 |

The OH group containing compounds in Table 3 are as follows:

(1) Compound 32 of the formula

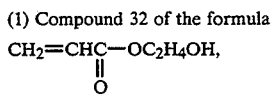

(2) Compound 33 of the formula

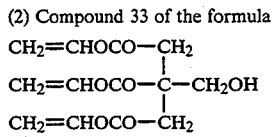

and (3) Compound 34 of the formula

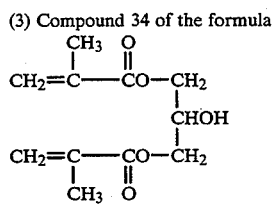

TABLE 2

| Example | 3 | 4 | 5 | 6 |
|---|---|---|---|---|
| Solvent for reprecipitation and purification | Mixed solvent | MeOH | Mixed solvent | MeOH |
| Analysis data of block copolymer | | | | |
| Presence of low molecular compound (GPC analysis) | No | No | No | No |
| Presence of unsaturated group (IR analysis) | Yes | Yes | Yes | Yes |
| Percentage of Compound 31 in the structural unit (B) (%) | 23 | 50 | 35 | 57 |
| Ratio of structural unit (A)/structural unit (B) | 32/68 | 30/70 | 29/71 | 27/73 |
| Viscosity of 30% polymer solution (poise/25° C.) | 0.9 | 0.7 | 1.1 | 0.6 |

Examples 11 to 15

(1) Synthesis of peroxy bond containing polymer

In Examples 11 to 15, 300 parts of DMF was charged in the same reactor as used in Example 1, and heated to 70° C. under blowing of nitrogen gas thereinto. Further, to the reactor was charged a mixture of 280 parts of MEK, 200 parts of methacrylic acid ethylene glycol monoester (BLENMER PE200, manufactured by Nippon Oil & Fats Co., Ltd.; EO recurring unit n=4.5), 40 parts of n-butyl methacrylate and 20 parts of Compound 28 of the formula —[CO(CH$_2$)$_4$COO(C$_2$H$_4$O)$_3$-CO(CH$_2$)$_4$COOO]$_{10}$— over 2 hours and a polymerization reaction was carried out for further 3 hours to give a peroxy bond containing polymer. As a result of GC analysis of the residual monomer content, the polymer conversion was 98% or more.

(2) Synthesis of block copolymer composition

In each Example, a predetermined amount of the peroxy bond containing polymer solution synthesized in the above process (1) as shown in Table 5 was charged in the same reactor as used above, respectively. To the solution was dropwise added at 70° C. a mixture of the monomer shown in Table 5 and DMF over 30 minutes under blowing of nitrogen gas thereinto, and the polymerization reaction was further carried out at 70° C. for 10 hours. As the result of GC analysis of the resulting polymer, it was found that the polymer conversion of the monomer was 98%.

(3) Reaction of introducing unsaturated groups

The polymer solution synthesized in the above process (2) was diluted with MEK so that the effective component concentration may be 20%. Subsequently, a polymer solution was prepared by further adding pyridine to 120 parts of the 20% solution prepared above following the procedures in Example 2. To the resulting solution was added dropwise a chlorine compound solution as shown in Table 6 at 50° C. for 30 minutes and the mixture was allowed to react at the same temperature for 3 hours to effect introduction of the unsaturated groups. After completion of the reaction, the pyridine hydrochloride was removed by filtration. The resulting polymer solution was diluted 3-fold with DMF and the diluted solution was poured into a great excess of methanol with stirring to effect reprecipitation and purification of the polymer.

When the well dried polymer powder was subjected to GPC analysis in the same manner as in Example 1, it was found that now low molecular compound was contained in these polymers. Further, it was found that the saturated groups were introduced in the polymer by the IR analysis. NMR analysis also demonstrated that all the OH groups in the polymer disappeared and the unsaturated groups were newly introduced.

To a mixed solvent of 100 parts of methanol and 200 parts of toluene were added 10 parts of the polymer powders in Examples 11 to 15, respectively, and each of the mixtures was stirred at 50° C. for 8 hours to extract the acrylic polymer containing no fluorine (which contains the unsaturated group) which is one of the two by-produced components. Subsequently, the remaining polymer was in 600 parts of trichro-trifluoroethane and the mixture was stirred at 40° C. for 48 hours to extract the fluorine containing polymer.

The weight of each extract was measured to determine the constitutional ratio of the block copolymer/fluorine free acrylic polymer/fluorine containing block copolymer in the powder.

Further, the weight ratio of the fluorine containing polymer moiety [structural unit (A)] to the fluorine free polymer moiety [structural unit (B)] in the block copolymer was calculated by referring to the % introduction of the unsaturated groups obtained by the NMR analysis.

The block copolymer after extraction of the by-products was dissolved or dispersed in deuterium substituted acetone and analysis was carried out to determine the proportion of the polymer moiety consisting of the unit of the structural formula (III) (i.e. Compound 31 of the formula

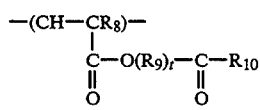

in the structural unit (B) in the same manner as in Example 1. Further, the viscosity of the 30 wt % solution of the block copolymer powder in DMF was determined at 25° C.

The results are shown in Tables 5 and 6.

TABLE 5

| Example | 11 | 12 | 13 | 14 | 15 |
|---|---|---|---|---|---|
| Peroxy bond containing polymer solution (part) | 100 | 100 | 100 | 100 | 100 |
| Composition of the mixed solution (part) | | | | | |
| DMF | 11.6 | 46.4 | 87 | 46.4 | 87 |
| Fluorine containing monomer (1) | 6.25 | 25 | 58 | — | 34.8 |
| Fluorine containing monomer (2) | — | — | — | 25 | — |
| MMA | — | — | — | — | 23.2 |
| Ratio of monomers in the first polymerization step and the second polymerization step | 80/20 | 50/50 | 30/70 | 50/50 | 30/70 |

The fluorine containing monomers in Table 5 are as follows:
(1) Compound 35 of the formula CH$_2$=CHCOOC$_2$H$_4$N(CH$_3$)SO$_2$C$_8$F$_{17}$ and
(2) Compound 36 of the formula CH$_2$=C(CH$_3$)COOCH$_2$CF$_3$

TABLE 6

| Example | 11 | 12 | 13 | 14 | 15 |
|---|---|---|---|---|---|
| Composition of polymer solution (part) | | | | | |
| 20% polymer solution | 120 | 120 | 120 | 120 | 120 |
| Pyridine | 13.5 | 8.4 | 5.1 | 8.4 | 5.1 |
| Composition of the mixed solution (part) | | | | | |
| MEK | 28.5 | 32.8 | 15.7 | 33.1 | 15.9 |
| Chlorine compound (1) | 11.5 | 7.2 | 4.3 | — | — |
| Chlorine compound (2) | — | — | — | 6.9 | 4.1 |
| Molar ratio of OH groups in the block copolymer/chlorine compound/pyridine | 1/1.2/3 | 1/1.2/3 | 1/1.2/3 | 1/1.2/3 | 1/1.2/3 |

TABLE 6-continued

| Example | 11 | 12 | 13 | 14 | 15 |
|---|---|---|---|---|---|
| Analysis data of polymer composition Note (1) | 6.5/ 3.0/ 0.5 | 7.3/ 1.5/ 1.2 | 6.0/ 1.3/ 2.7 | 7.5/ 1.3/ 1.2 | 5.8/ 1.5/ 2.7 |
| Analysis data of block copolymer | | | | | |
| Percentage of Commound 31 in the structural unit (B) (%) | 88 | 88 | 88 | 88 | 88 |
| Ratio of structural unit (A)/structural unit (B) | 15/ 85 | 41/ 59 | 60/ 40 | 40/ 60 | 62/ 38 |
| Viscosity of 30% polymer solution | 1.3 | 1.1 | 0.6 | 1.4 | 1.2 |

The chlorine compounds in Table 6 are as follows:

(1) Compound 37 of the formula

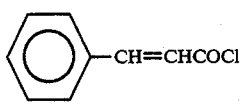

and (2) Compound 38 of the formula

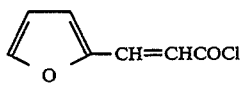

Note (1): The values indicate the polymer compositions in terms of the constitutional ratio of the block copolymer/fluorine free polymer/fluorine containing polymer.

Examples 16 and 17

(1) Synthesis of block copolymer

In Examples 16 and 17, 150 parts of MEK was charged in the same reactor as used in Example 1, and heated to 70° C. under blowing of nitrogen gas thereinto. Further, to the reactor was charged a mixture of 204 parts of MEK, 100 parts of MMA, 90 parts of n-butyl methacrylate (n-BMA), 10 parts of HEMA and 17 parts of Compound 28 of the formula $-[CO(CH_2)_4COO(C_2H_4O)_3CO(CH_2)_4COOO]_{10}-$ over 2 hours and a polymerization reaction was carried out for further 4.5 hours to give a peroxy bond containing polymer. As the result of GC analysis of the residual monomer content, it was found that polymer conversion was 98% or more. Subsequently, a mixture of 160 parts of MEK and 86 parts of Compound 39 of the formula $C_6F_{13}CON(C_2H_5)CH_2OCOC(CH_3)=CH_2$ was added dropwise to the polymer over 30 minutes and a polymerization reaction was further carried out at 70° C. for 3 hours and then at 77° C. for 3 hours. As a result of GC analysis of the resulting polymer, the polymer conversion of the monomer was 98% or more.

(2) Reaction of introducing unsaturated groups

The polymer solution synthesized in the above process (1) was diluted with MEK so that the effective component concentration may be 30 %. Subsequently, a polymer solution was prepared by further adding pyridine to 400 parts of the 30% solution prepared above following the procedures in Example 2. To the resulting solution was added dropwise a chlorine compound solution as shown in Table 7 at 40° C. for 60 minutes and the mixture was allowed to react at the same temperature for 5 hours to effect introduction of the unsaturated groups. After completion of the reaction, the pyridine hydrochloride was removed by filtration. The resulting polymer solution was diluted 2-fold with MEK and the diluted solution was poured into a great excess of $H_2O$ or methanol with stirring to effect reprecipitation and purification of the polymer.

When the well dried polymer powder was subjected to GPC analysis in the same manner as in Example 1, it was found that no low molecular compound was contained in these polymers. Further, it was found that the saturated groups were introduced into the polymer by the IR analysis. NMR analysis also demonstrated that all the OH groups in the polymer disappeared and the unsaturated groups were newly introduced.

To a mixed solvent of 400 parts of methanol and 1600 parts of toluene were added 100 parts of the polymer powders in Examples 16 and 17, respectively, and each of the mixtures was stirred at 50° C. for 8 hours to extract the acrylic polymer containing no fluorine (which contains the unsaturated group) which is one of the two by-produced components. Subsequently, the remaining polymer was charged in 2000 parts of trichrolo-trifluoroethane and the mixture was stirred at 40° C. for 24 hours to extract the fluorine containing polymer.

The weight of each extract was measured to determine the constitutional ratio of the block copolymer/fluorine free acrylic polymer/fluorine containing block copolymer in the powder. Further, the weight ratio of the fluorine containing moiety [structural unit (A)] to the fluorine free polymer moiety [structural unit (B)] in the block copolymer was calculated by referring to the % introduction of the unsaturated groups obtained by the NMR analysis.

The block copolymer after extraction of the by-products, was dissolved or dispersed in deuterium substituted acetone and NMR analysis was carried out to determine the proportion of the polymer moiety consisting of the unit of the structural formula (III) (i.e. Compound 31 of the formula

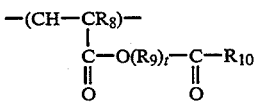

in the structural unit (B)) in the same manner as in Example 1. Further, the viscosity of the 30 wt % solution of the powder of block copolymer in MEK was determined at 25° C. The results are shown in Table 7.

Examples 18 and 19

Block copolymers were synthesized, respectively in Examples 18 and 19 exactly in the same manner as in Example 12 except that a mixture of 80 parts of MMA, 70 parts of n-BMA and 50 parts of HEMA was used in the first polymerization step and a mixture of 371 parts of MEK and 200 parts of Compound 1 of the formula $CF_3(CF_2)_7CH_2CH_2OCO-CH=CH_2$ in the second polymerization step.

Further, the introduction of the unsaturated Groups and the purification of the block copolymer and analysis thereof were carried out under the same conditions in Examples 16 and 17. The results are shown in Table 7.

TABLE 7

| Example | 16 | 17 | 18 | 19 |
|---|---|---|---|---|
| Composition of polymer solution (part) | | | | |
| 30% polymer solution | 400 | 400 | 400 | 400 |
| Pyridine | 7.6 | 7.6 | 27.3 | 27.3 |
| Composition of the dropping solution (part) | | | | |
| MEK | 16.8 | 13.3 | 27.6 | 25.8 |
| Chlorine compound (1) | 3.2 | — | — | — |
| Chlorine compound (2) | — | — | 22.4 | — |
| Chlorine compound (3) | — | 6.7 | — | 24.2 |
| Molar ratio of OH groups in the block copolymer/chlorine compound/pyridine | 1/1.1/3 | 1/1.1/3 | 1/1.1/3 | 1/1.1/3 |
| Analysis data of polymer composition Note (1) | 70/22.8/7.2 | 70/23/7 | 72/15/14 | 71/16/14 |
| Analysis data of block copolymer | | | | |
| Percentage of Compound 31 in the structural unit (B) (%) | 7 | 10 | 41 | 42 |
| Ratio of structural unit (A)/structural unit (B) (%) | 33/67 | 33/67 | 42/58 | 41/59 |
| Viscosity of 30% polymer solution | 0.6 | 0.8 | 0.75 | 0.9 |

Note (1) The values indicate the polymer compositions in terms of the constitutional ratio of the block copolymer/fluorine free polymer/fluorine containing polymer. The chlorine compound (1) to (3) are as follows:
(1) Compound 40 of the formula $CH_2=CH-COCl$,
(2) Compound 41 of the formula $CH_2=CHCOOC_2H_4OCOCl$ and (3) Compound 27 of the formula

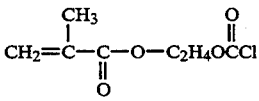

Comparative example 1

Introduction of the unsaturated groups into the block copolymer was carried out by reacting three compounds; i.e. the same block copolymer as prepared in the process (2) of Example 1, an isocyanate compound and HEMA for the purpose of comparison with Example 5.

A mixture of 40 g of the block copolymer obtained in the same manner as in the process (2) of Example 1 and 120 g of DMF was prepared in the same reactor as used in Example 5. To the solution were added 52 g of a biuret compound using hexamethylene diisocyanate (DURANATE 24A, manufactured by Asahi Chemical Industry Co., Ltd.) and 200 ppm of dibutyltin dilaurate, and the mixture was heated to 70° C. to effect reaction. After 3 hours, the polymer solution became gelatinous, so that the intended reaction with HEMA could not be carried out.

Comparative example 2

Introduction of the unsaturated groups into the block copolymer was carried out by reacting three compounds, i.e. the block copolymer of Example 18 to which no unsaturated group was introduced yet, an isocyanate compound and 2-hydroxyethyl acrylate (HEA) for the purpose of comparison with Example 18.

In the same reactor as used in Comparative example 1 was charged 120 g of a 30% polymer solution prepared by diluting with MEK, 52 g of the same biuret compound using hexamethylene diisocyanate and 200 ppm of dibutyltin dilaurate as used in Comparative example 1, and the mixture was heated to 70° C. to effect reaction for 4 hours. Subsequently, after the reaction mixture was cooled to room temperature, 48 g of HEA and 50 ppm of hydroquinone dimethyl ether were added thereto, and the mixture was heated to 65° C. to carry out the reaction for 4 hours. After completion of the reaction, the mixture was diluted 2-fold with MEK and the diluted solution was poured into a great excess of methanol with stirring to effect reprecipitation and purification of the polymer.

When MEK was added to the well dried polymer powder to prepare a 30 wt % solution, the powder was dissolved or dispersed with difficulty in MEK requiring much more time than in the case of Example 18. The viscosity at 25° C. of the polymer solution was 7.2 poise.

Comparative example 3

For the purpose of comparison with Example 13, a random copolymer was synthesized through polymerization reaction of methacrylic acid ethylene glycol monoester (BLENMER PE200), isobutyl methacrylate (IBMA) and fluorine containing monomer. Subsequently, the introduction of the unsaturated group was carried out in the same manner as in Example 13 to obtain a random fluoro copolymer containing an unsaturated group.

To describe in detail, in order to obtain the above random copolymer, 181 parts of DMF was charged into the same reactor as used in Example 7, and heated to 80° C. under blowing of nitrogen gas thereinto. To the reactor was added dropwise a mixture of 83 parts of BLENMER PE200, 17 parts of IBMA, 100 parts of Compound 5 of the formula $CF_3(CF_2)_7SO_2N(CH_3)CH_2CH_2OCOCH=CH_2$, 10 parts of Compound 42 of the formula $CH_3(CH_2)_3CH(C_2H_5)COOOC(CH_3)_3$ and 180 parts of DMF over 2 hours and the mixture was further reacted at the same temperature for 10 hours. GC analysis showed that the polymer conversion of the monomer was 97% or more. The resulting polymer solution was diluted with DMF to prepare a 20 wt % solution.

Introduction of the unsaturated groups was carried out under same conditions and in the same manner as in the process (3) of Example 13. GPC analysis showed that the polymer contained no low molecular compound, and IR analysis showed that the unsaturated groups were introduced into the polymer. NMR analysis further showed that about 70% of the OH groups in the polymer disappeared and the unsaturated groups were introduced instead. Compared with Example 7, % introduction of the unsaturated groups was low by about 30%. When a 30 wt % DMF solution of the polymer was prepared, the solution was unstable and the polymer started to precipitate soon after the solution was left to stand, so that the viscosity of the polymer could not be determined. A stable polymer solution was obtained only when the polymer was diluted to 10 wt % with DMF.

Examples 20 to 38 and Comparative examples 4 and 5

The fluoropolymers containing unsaturated groups obtained in Examples 1 to 19 and Comparative Examples 2 and 3 were evaluated for sensitivity to an ultraviolet (UV) ray, and various tests were also carried out.

To the 30% solutions used for the viscosity determination in each example and Comparative example was added a photopolymerization initiator (DAROCURE-1173, manufactured by Merck & Co., represented by "a" in Table 8) or a sensitizer (5-nitroacenaphthene, represented by "b" in Table 8) in an amount of 4 parts per 100 parts of the polymer to prepare test solutions. Subsequently, aluminum plates (A1100, manufactured by Nippon Test Panel) and soft vinyl chloride films (DOP content: 50 wt %) were coated with the polymer solutions by means of a bar coater so that the dry thickness may be 10 μ, followed by drying at 120° C. for 5 minutes in the case of aluminum substrates and at 70° C. for 1 hour in the case of soft vinyl chloride film substrates to provide sample plates, respectively. The sample plates were irradiated with light using a 2 KW high-pressure mercury lamp from the distance of 20 cm for a predetermined time.

The thus irradiated sample plates were evaluated for the following items.

1) Solvent resistance

The degree of UV curing was evaluated in this test. Using the same solvent as used in the film formation when the sample plates were prepared, immersion test was carried out at normal temperature for 24 hours in the case of aluminum substrates; while in the case of vinyl chloride film substrates, the sample plates were rubbed back and forth 20 times with a cotton web impregnated with the solvent. Evaluation was made according to the following criteria:

⊚: No change occurred in the appearance.
○: The film slightly swelled but no degradation occurred.
Δ: The film swelled and partially degradated.
×: The film was dissolved.

2) Contact angle

Contact angles to water and to dodecane were measured to evaluate water and oil repellency of the surface.

3) Adhesion

Degree of lifting occurred in the coating films formed on the substrates was evaluated after 90° bending was repeated 30 times.

⊚: Neither cracking nor lifting occurred.
○: Cracking partially occurred but with no lifting.
Δ: Lifting partly observed along the bend line.
×: Lifting spread from the bend line.

Irradiation time and test results are shown in Tables 8 and 9.

TABLE 8

| Example | Kind of polymer | Photopolymerization initiator | Type of substrate | Irradiation time (sec.) | Solvent resistance | Contact angle (degree) Water | Contact angle (degree) Dodecane | Adhesion |
|---|---|---|---|---|---|---|---|---|
| 20 | Example 1 | a | PVC | 0 | × | 116 | 74 | ⊚ |
|    |           |   |     | 5 | ⊚ | 116 | 74 | ⊚ |
| 21 | Example 2 | a | PVC | 0 | × | 116 | 74 | ⊚ |
|    |           |   |     | 5 | ⊚ | 116 | 74 | ⊚ |
| 22 | Example 3 | a | Al  | 0 | × | 114 | 73 | ⊚ |
|    |           |   |     | 10 | ⊚ | 115 | 73 | ⊚ |
| 23 | Example 4 | a | PVC | 4 | ⊚ | 115 | 73 | ⊚ |
| 24 | Example 5 | a | PVC | 0 | × | 115 | 74 | ⊚ |
|    |           |   |     | 2 | Δ | 115 | 73 | ⊚ |
|    |           |   |     | 6 | ⊚ | 116 | 74 | ⊚ |
|    |           |   |     | 10 | ⊚ | 115 | 74 | ⊚ |
| 25 | Example 6 | b | Al  | 0 | × | 113 | 70 | ⊚ |
|    |           |   |     | 10 | Δ | 113 | 70 | ⊚ |
|    |           |   |     | 30 | ⊚ | 113 | 70 | ⊚ |
| 26 | Example 7 | a | PVC | 0 | × | 114 | 73 | ⊚ |
|    |           |   |     | 5 | ⊚ | 114 | 73 | ⊚ |
| 27 | Example 8 | a | PVC | 0 | × | 116 | 74 | ⊚ |
|    |           |   |     | 5 | ⊚ | 116 | 74 | ⊚ |
| 28 | Example 9 | a | PVC | 0 | × | 115 | 74 | ⊚ |
|    |           |   |     | 5 | ⊚ | 115 | 74 | ⊚ |
| 29 | Example 10 | a | PVC | 0 | × | 115 | 74 | ⊚ |
|    |           |   |     | 5 | ⊚ | 115 | 74 | ⊚ |
| 30 | Example 11 | b | Al | 5 | × | 108 | 64 | ⊚ |
|    |           |   |     | 10 | Δ | 108 | 64 | ⊚ |
|    |           |   |     | 20 | ⊚ | 108 | 64 |   |
| 31 | Example 12 | b | Al | 5 | Δ | 113 | 69 | ⊚ |
|    |           |   |     | 20 | ⊚ | 113 | 69 | ⊚ |
| 32 | Example 13 | b | Al | 20 | × | 116 | 74 | ⊚ |
| 33 | Example 14 | b | Al | 0 | × | 108 | 63 | ⊚ |
|    |           |   |     | 20 | ⊚ | 108 | 64 | ⊚ |

The photopolymerization, initiators and the like represented by "a" and "b" in Table 8 are as follows:
  a: Photopolymerization initiator, DAROCURE 1173
  b: Sensitizer, 5-nitroacenaphthene

TABLE 9

| Example | Kind of polymer | Photo-polymerization initiator | Type of substrate | Irradiation time (sec.) | Solvent resistance | Contact angle (degree) Water | Contact angle (degree) Dodecane | Adhesion |
|---|---|---|---|---|---|---|---|---|
| 34 | Example 15 | b | Al | 30 | ⊚ | 113 | 71 | ⊚ |
| 35 | Example 16 | a | PVC | 0 | x | 116 | 74 | ⊚ |
|  |  |  |  | 3 | Δ | 116 | 74 | ⊚ |
|  |  |  |  | 10 | ○ | 116 | 73 | ⊚ |
|  |  |  |  | 20 | ⊚ | 116 | 73 | ⊚ |
| 36 | Example 17 | a | Al | 0 | x | 116 | 74 | ⊚ |
|  |  |  |  | 20 | ⊚ | 116 | 74 | ⊚ |
| 37 | Example 18 | a | PVC | 0 | x | 116 | 74 | ⊚ |
|  |  |  |  | 5 | ○ | 116 | 74 | ⊚ |
|  |  |  |  | 15 | ⊚ | 116 | 74 | ⊚ |
|  |  |  | Al | 0 | x | 116 | 74 | ⊚ |
|  |  |  |  | 15 | ⊚ | 116 | 74 | ⊚ |
| 38 | Example 19 | a | PVC | 0 | x | 115 | 74 | ⊚ |
|  |  |  |  | 10 | ⊚ | 115 | 74 | ⊚ |
| Comp. Example 4 | Comp. Example 2 | a | PVC | 0 | x | 100 | 61 | ○ |
|  |  |  |  | 5 | Δ | 100 | 60 | ○ |
|  |  |  |  | 10 | Δ | 100 | 60 | ○ |
|  |  |  |  | 15 | ⊚ | 100 | 60 | ○ |
|  |  |  | Al | 0 | Δ | 100 | 60 | ○ |
|  |  |  |  | 15 | ⊚ | 100 | 60 | ○ |
| 5 | Comp. Example 3 | b | Al | 0 | x | 98 | 58 | x |
|  |  |  |  | 10 | x | 98 | 58 | x |
|  |  |  |  | 20 | Δ | 98 | 58 | x |

The photopolymerization initiator and the like represented by "a" and "b" in Table 9 mean the same as described with respect to Table 8.

From these test data, it became apparent that the present fluorine containing block copolymers having unsaturated groups have UV sensitivity and undergo curing and that they have extremely excellent adhesion to the substrates and water and oil repellency on the surface. It should be noted, however, the water and oil repellency in Examples 11 and 14 showed slightly lower values which demonstrate that such properties depend on the composition and presence ratio of the structural unit (A). In the case of unirradiated sample plates, the polymers showed good solubility in solvents in contrast to the UV-irradiated cases where the coated films are insolubilized. It can be seen from these results that the present block copolymer can fully be utilized as a resist material.

On the other hand, in the case of the polymer of Comparative example 2, good adhesion was exhibited but insufficient water and oil repellency on the surface compared with the polymer of Example 18. This control polymer also showed poorer UV sensitivity than the polymer of Example 18. It was found that there is not so much difference in the solvent solubility of the films before and after UV irradiation. In the case of the random copolymer of Comparative example 3, it tended to show poor adhesion to the substrates and has low sensitivity compared with the polymer of Example 7.

Examples 39 to 43 and Comparative examples 6 and 7

Polymers of Examples 1, 3, 17 and 18, Example 1-(2) and Comparative Example 2 were evaluated for the performance as a surface modifier.

Powders of these polymers were diluted respectively with neopentyl glycol diacrylate so that the concentration of the polymer may be 20%.

A solution of 30 parts of epoxy acrylate (SP-1506, trade name, manufactured by Showa Kobunshi K.K.), 30 parts of urethane acrylate (M-1100, trade name, manufactured by Toa Goseikagakukogyo K.K.), 35 parts of ethylene glycol diacrylate and 5 parts of benzoin isobutyl ether was prepared, and to 100 parts of the thus prepared solution were added 10 parts of the 20% solutions prepared above, respectively. Each of the thus prepared mixture was applied on the same aluminum plates as used in Example 20 by means of an applicator so that the film thickness may be 35 microns.

The thus prepared sample plates were irradiated with light using the same high pressure mercury lamp as used in Example 20 from the distance of 10 cm for 10 seconds to effect curing of the coating films. The thus cured films were immersed in acetone or 10% aqueous sulfuric acid for 48 hours to evaluate water and oil repellency before and after the immersion. The tests results are shown in Table 10.

TABLE 10

| | | Contact angle (degree) | | | | | |
|---|---|---|---|---|---|---|---|
| | | Before immersion | | After immersion in acetone | | After immersion in 10% aqueous sulfuric acid | |
| Example | Kind of polymer | Water | Dodecane | Water | Dodecane | Water | Dodecane |
| 39 | Example 1 | 110 | 69 | 110 | 67 | 110 | 69 |
| 40 | Example 3 | 110 | 69 | 110 | 68 | 110 | 69 |
| 41 | Example 8 | 110 | 69 | 110 | 69 | 110 | 69 |

TABLE 10-continued

| Example | Kind of polymer | Contact angle (degree) | | | | | |
|---|---|---|---|---|---|---|---|
| | | Before immersion | | After immersion in acetone | | After immersion in 10% aqueous sulfuric acid | |
| | | Water | Dodecane | Water | Dodecane | Water | Dodecane |
| 42 | Example 17 | 109 | 68 | 108 | 68 | 109 | 68 |
| 43 | Example 18 | 112 | 71 | 110 | 70 | 112 | 71 |
| Comp. Example 7 | Example 1 (2) | 110 | 69 | 100 | 59 | 110 | 69 |
| Comp. Example 7 | Comp. Example 2 | 96 | 50 | 98 | 48 | 96 | 50 |

It can be seen from the above data that when the present block copolymer is added to an activation energy ray-curing resin, it can impart, to the surface of the resin, water and oil repellency characteristic to fluorine and that it is chemically bonded with the matrix polymer with no substantial reduction in the water and oil repellency even after immersion in acetone to particularly show extended retention of the modifying effect.

The block copolymers having no such unsaturated groups tend to have lower water and oil repellency after immersion in acetone, while they suffered no reduction in their performance after immersion in the aqueous sulfuric acid. The polymer of Comparative example 2 tended to have insufficient modifying effect.

Examples 44 to 46

Polymers of Examples 35, 36 and 37 were evaluated for the performance as a surface modifier.

A urethane acrylate (SP-1506, trade name, manufactured by Toa Goseikagaku-kogyo K.K.) was dissolved in MEK to prepare a 30% solution, and 4 parts of a photopolymerization initiator (DAROCURE-1173) was added per 100 parts of the polymer to provide a test solution. To the test solution were added the solutions prepared in Examples 35 to 37 in an amount of 3 parts, respectively, and sample plates were prepared by applying the resulting mixtures, respectively, on aluminum plates in the same manner as in Example 20 to form films, followed by drying.

The sample plates were irradiated with an UV ray under the same conditions as in Example 39, followed by the same immersion test in a 10% aqueous sulfuric acid as in Example 39. Further, an adhesive tape having a width of 5 cm manufactured by Sekisui Chemical Co., Ltd. was adhered with pressure onto the cured films by reciprocating a 2 kg roller twice thereon. After the cured films were left to stand at 50° C. for 3 days, the tape was peeled off therefrom, and the tape surface was subjected to ESCA analysis (analysis using X-ray photoelectron analyzer) to observe if there is any fluorine component transferred to the tape. The test results are shown in Table 11.

TABLE 11

| Example | Kind of polymer | Contact angle (degree) | | | | Transference of fluorine component (ESCA analysis) |
|---|---|---|---|---|---|---|
| | | Before immersion | | After immersion in 10% aqueous sulfuric acid | | |
| | | Water | Dodecane | Water | Dodecane | |
| 44 | Example 16 | 116 | 73 | 115 | 72 | None |
| 45 | Example 17 | 115 | 73 | 115 | 73 | None |
| 46 | Example 18 | 116 | 74 | 116 | 74 | None |

From the above data, no deterioration in the surface performance was observed even after immersion in the aqueous sulfuric acid and it was found that there is no transference of fluorine component to the adherend (tape).

Examples 47 to 49

The polymer solutions as used in Examples 21, 23 and 25 were used to evaluate their performances as resist materials. The polymer solutions of Examples 48 to 50 were applied on aluminum plates, respectively so that the dry thickness may be 1 micron and dried at 100° C. for 10 minutes. A planographic negative was superposed intimately on each film and an UV ray was irradiated thereon with a 2 KW high-pressure mercury lamp from the distance of 20 cm for 10 seconds. After the negative was removed, the sample plate was immersed in acetone to effect development and provide a sample dry planographic printing plate. Printing was carried out using the sample plate to evaluate performance. The test results are shown in Table 12.

TABLE 12

| Example | Kind of polymer | Image dissolution | Printing propery |
|---|---|---|---|
| 47 | Example 2 | Good | Good |
| 48 | Example 4 | Good | Good |
| 49 | Example 6 | Good | Good |

The test results demonstrated that the present polymers have excellent printing properties and are also useful as resist materials.

What is claimed is:

1. A process for preparing a fluorine containing block copolymer with an unsaturated group, said process comprising the steps of:

reacting a block copolymer with a compound of the general formula $R_{10}COCl$ at a temperature of 10° to 60° C. to allow a dehydrochlorination to take place, said block copolymer consisting essentially of a first polymer moiety (A) forming a first block of said block copolymer, a second polymer moiety (B) and a third polymer moiety (C), said second and third polymer moieties forming a second block connected to the first block, said second block including a random copolymer; and preparing a 30 wt % solution of the block copolymer by mixing said block copolymer with a non-fluorine organic solvent which is a good solvent for the second polymer moiety (B), the solution having the viscosity of 0.05 to 7 poise at 25° C.;

wherein $R_{10}$ of said general formula $R_{10}COCl$ is selected from the group consisting of

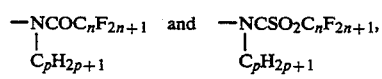

$CH_2$=CH—, $CH_2$=C(CH_3)—, $CH_2$=CHCOOC_2H_4O— or $CH_2$=C(CH_3)COOC_2H_4O—;

said first polymer moiety (A) including a fluoroalkyl (meth) acrylate polymer of the formula

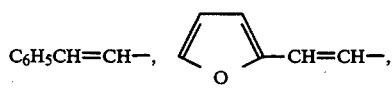

wherein $R_1$ is selected from the group consisting of a hydrogen atom and a methyl group; $R_2$ represents —$C_pH_{2p}$—, —$C(C_pH_{2p+1})H$—, —$CH_2C(C_pH_{2p+1})H$— or —$CH_2CH_2O$—;

wherein $R_f$ is selected from the group consisting of $C_nF_{2n+1}$, $(CF_2)_nH$, $(CF_2)_pOC_mH_{2m}C_iF_{2i+1}$, $(CF_2)_pOC_mH_{2m}C_iF_{2i}H$,

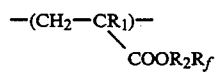

wherein p, is an integer from 1 to 10, n is an integer from 1 to 16, i is 0 or an integer from 1 to 16, and m is 0 or an integer from 1 to 10;

said second polymer moiety (B) including a vinyl polymer represented by the formula

wherein $R_3$ is selected from the group consisting of a hydrogen atom, a methyl group and —$CH_2COOH$; $R_4$ is selected from the group consisting of —$COOR_5$; $R_5$ is selected from the group consisting of a hydrogen atom,

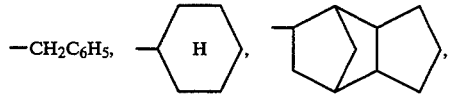

—$CH_2CH$—$CH_2$, —$CH_2CH_2N(C_sH_{2s+1})_2$,
—$CH_2CH$=$CH_2$, $C_NH_{2n+1}$ (straight or branched ),
—$C_pH_{2p+1}OH$ (straight or branched), —$CH_2C$-$H(OH)CH_3$, $(C_2H_4O)_rC_sH_{2s+1}$,
$[CH_2CH(CH_3)O]_rC_sH_{2s+1}$, in which p is an integer from 1 to 10, n is an integer from 1 to 16, r is an integer from 2 to 20 and s is 0 or an integer from 1 to 8,
—$CONR_6R_7$ wherein $R_6$ is selected from the group consisting of a hydrogen atom and $C_pH_{2p+1}$; and $R_7$ is selected from the group consisting of a hydrogen atom, —$CH_2OH$ and $C_pH_{2p+1}$ (straight or branched) in which p is an integer from 1 to 10,

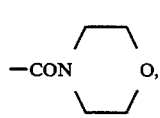

—$CONHC(CH_3)_2CH_2COCH_3$, —$CONHC(CH_3)_2CH_2SO_3H$, —$C_5H_6$, —CN and —$OCOC_nH_{2n+1}$ (straight or branched) wherein n is an integer from 1 to 16;

said third polymer moiety (C) including a (meth) acrylic ester polymer of the general formula

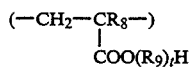

wherein $R_8$ is selected from the group consisting of a hydrogen atom and a methyl group; $R_9$ is selected from the group consisting of $C_2H_4O$— and $CH_2CH(CH_3)O$—; and t is an integer from 1 to 20.

2. A process for preparing a fluorine containing block copolymer having an unsaturated group, according to claim 1, wherein said first polymer moiety consists of not less than 40% by weight of said fluoroalkyl (meth) acrylate polymer and said second polymer moiety consists of not more than 60% by weight of said vinyl polymer.

3. A fluorine containing block copolymer having an unsaturated group, prepared by the process of claim 1.

4. A fluorine containing block copolymer having an unsaturated group, prepared by the process of claim 2.

UNITED STATES PATENT AND TRADEMARK OFFICE
CERTIFICATE OF CORRECTION

PATENT NO. : 5,428,108
DATED : June 27, 1995
INVENTOR(S) : Yoshihiro Oshibe, et. al.

It is certified that error appears in the above-indentified patent and that said Letters Patent is hereby corrected as shown below:

Title page, item [21], Appl. No. 192,153 should be inserted of --192,133--.

Signed and Sealed this

Twenty-sixth Day of September, 1995

Attest:

BRUCE LEHMAN

*Attesting Officer*     *Commissioner of Patents and Trademarks*